United States Patent [19]

Höllerbauer

[11] Patent Number: 5,031,113
[45] Date of Patent: Jul. 9, 1991

[54] TEXT-PROCESSING SYSTEM

[75] Inventor: Werner Höllerbauer, Maria Enzersdorf, Austria

[73] Assignee: U.S. Philips Corporation, New York, N.Y.

[21] Appl. No.: 422,474

[22] Filed: Oct. 17, 1989

[30] Foreign Application Priority Data

Oct. 25, 1988 [AT] Austria .................................. 2647/88

[51] Int. Cl.[5] ............................................... G10L 5/00
[52] U.S. Cl. .................................... 364/513.5; 381/48; 381/44; 369/29
[58] Field of Search ............... 381/45, 44, 48; 369/29; 364/513.5

[56] References Cited

U.S. PATENT DOCUMENTS 3,676,856  7/1972  Manly ................................. 364/900
3,770,892 11/1973  Clapper .................................. 381/45
4,627,001 12/1986  Stapleford et al. .................... 381/48

Primary Examiner—Emanuel S. Kemeny
Attorney, Agent, or Firm—Bernard Franzblau

[57] ABSTRACT

A text-processing system in which the sound signal corresponding to a text is applied not only to a speech-recognition device (1) but also to a first further memory (15) for storage, start marks and end marks being allocated to the words detected by the speech-recognition device (1). These marks are related in time to the sound signals stored in the first further memory (15) and are stored in a second further memory (16). In this way a correlation is obtained between the sound signals stored in the first further memory and the individual words detected by the speech-recognition device. The detected words can be reproduced on a display device (13) thereby enabling the sound signal stored in the first further memory and corresponding to a specific detected word to be reproduced acoustically so as to verify the accuracy of a word detected by the speech-recognition device and to correct an erroneously detected word.

4 Claims, 1 Drawing Sheet

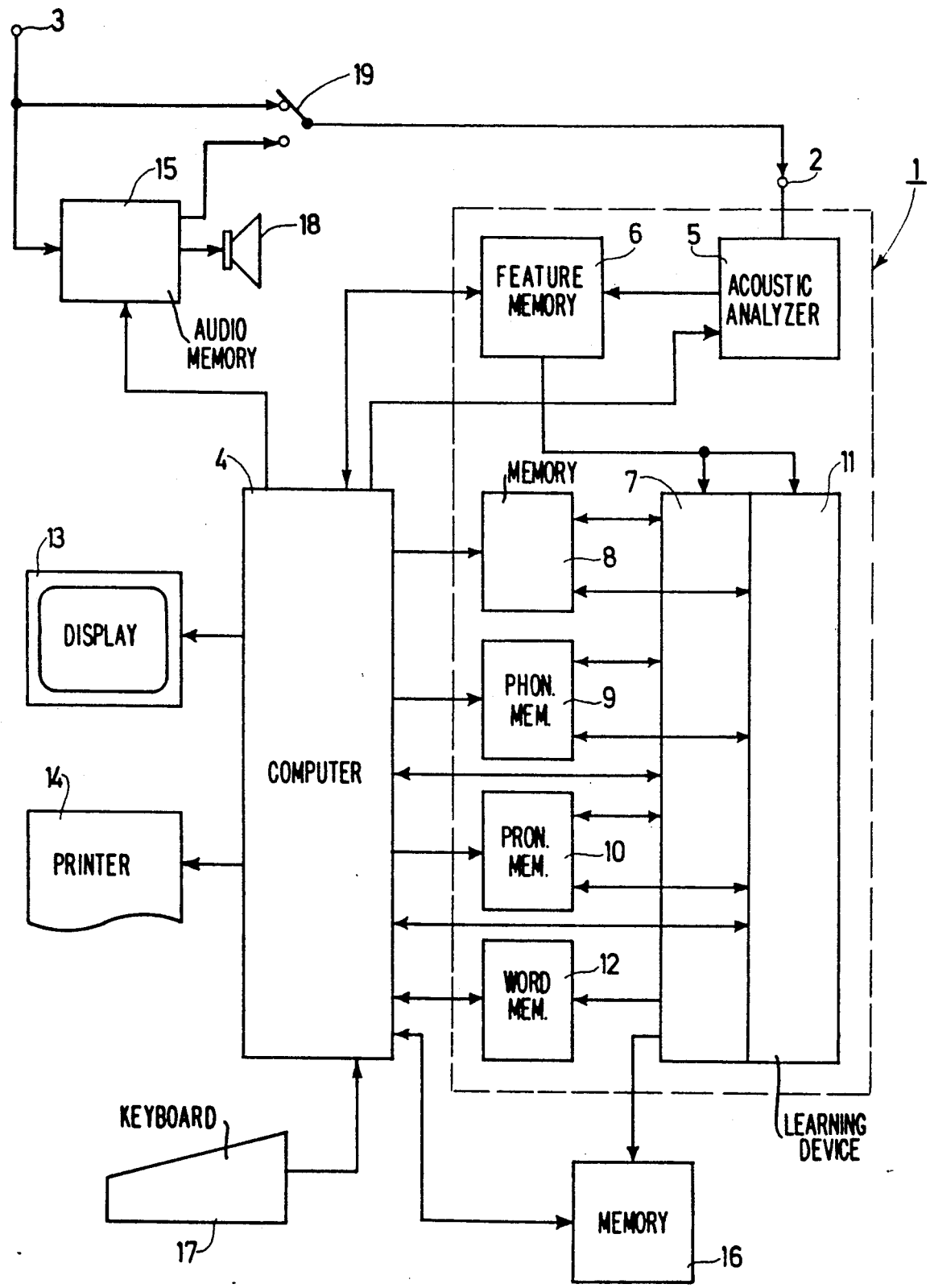

TEXT-PROCESSING SYSTEM

BACKGROUND OF THE INVENTION

This invention relates to a text-processing system in which sound signals corresponding to a text are applied to a speech-recognition device, which detects the words in the sound signals, after which said words are stored in a word memory in the form of digital signals and are applied from said memory to a further processing means. The detected words can be reproduced as a text by means of a display device, can be corrected when necessary, and can be printed by means of a printer. Such a text-processing system is described in U.S. Pat. No. 3,770,891, but this patent does not describe how to correct words which have not been detected correctly by the speech-recognition device. Since errors in the detection of words occur comparatively often in existing text-processing systems of this type, such a testing or correction facility is very important.

SUMMARY OF THE INVENTION

It is an object of the invention to construct a text-processing system of the type defined in the opening paragraph in such a way that the detected word can be checked and erroneously detected words can be corrected simply, rapidly and reliably. According to the invention this is achieved in that the sound signals are stored in a first further memory and start marks and end marks are allocated to the words detected by the speech recognition device under control of a computer which cooperates with a keyboard. The marks are related in time to the sound signals stored in the first further memory and said start marks and end marks are stored in a second further memory. By means of the start and end marks of a detected word as stored in the second further memory the computer can establish a correlation with the sound signal corresponding to a detected word and stored in the first further memory. Under the control of the computer a detected word can be high-lighted on the display device and at the same time the associated audio signal can be reproduced acoustically. By means of the keyboard, data can be loaded into the computer so that the detected word, which is high-lighted on the display device, can be corrected if necessary. Since the audio signals corresponding to a text are stored additionally and, moreover, in correlation with these stored sound signals the start marks and end marks, which are related in time to the words of the text detected by the speech recognition device, are also stored, it is simply possible at any time to allocate the associated sound signals to each detected word or, conversely, to allocate to the corresponding detected word to each portion of the sound signal. Thus, the user of the system can, for example, acoustically monitor the original sound signal which is associated with a word to be checked or corrected and which is high-lighted on the display device by means of the computer. The user can then correctly identify the relevant word and, if necessary, enter said word in corrected form into the system via the keyboard. Another possibility is to carry out a continuous check of the detected words of the text as displayed by the display device in that the sound signals stored in the first further memory are continually reproduced acoustically, the associated detected word being high-lighted simultaneously on the display device by means of the computer so that the instantaneously detected word is high-lighted continually and the user of the system at the same time hears the associated original sound signal, thereby enabling words requiring correction to be recognized simply and accurately by the user.

In a system in which the speech-recognition device cooperates with a learning device features characteristic of a sound-signal enunciated by a specific speaker of a word are derived from said sound signal by means of the speech-recognition device. These features are analyzed by the learning device by comparison with speech-related parameters applied to said learning device and the word corresponding to the relevant sound signal applied to said learning device and are stored in the speech-recognition device as speaker-related parameters. These parameters can be utilized by the speech-recognition device in the process of speech recognition. It was found to be advantageous that a detected word, which has been high-lighted on the display device and corrected by means of the keyboard, be applied to the learning device for analysis together with the features derived from the sound signal of the original word by means of the speech-recognition device. Furthermore, speaker-related parameters newly derived in the process of said analysis are also stored in the speech-recognition device. In this way corrected words are also included in a learning process of the system, so that, during use of the system, the error rate of incorrectly identified words decreases continually and consequently the entire text-processing system operates with an increased reliability.

In a system in which the speech-recognition device cooperates with a learning device, features which are characteristic of a sound signal enunciated by a specific speaker of a word are derived from said sound signal by means of the speech-recognition device. These features are analysed by the learning device by comparison with speech-related parameters applied to said learning device and the word corresponding to the relevant sound signal applied to said learning device and are stored in the speech-recognition device as speaker-related parameters. These parameters are utilized by the speech-recognition device in the process of speech recognition. It was also found to be advantageous that after all the words detected erroneously by the speech-recognition device have been corrected by means of the keyboard, the words forming the complete text together with the features derived from the sound signals of the original words by means of the speech recognition device be applied to the learning device for analysis. The speaker-related parameters newly derived in the process of said analysis are also stored in the speech-recognition device. In this way a learning process of the system allows not only for corrected words, but also for the entire text which has already been corrected so that, during use of the system, not only the error rate of incorrectly detected words is constantly reduced but the system is also rapidly adapted to the characteristic pronunciation of a specific speaker or to specific text sequences frequently used by a specific speaker.

BRIEF DESCRIPTION OF THE DRAWING

An embodiment of the invention will now be described in more detail, by way of non-limitative example, with reference to the accompanying drawing. The sole FIGURE of the drawing shows a block diagram of a text-processing system.

DESCRIPTION OF THE PREFERRED EMBODIMENTS

In the block diagram shown in the FIGURE, a speech-recognition device bears the reference numeral 1 and the sound signals corresponding to a text are applied to this device in the form of electric signals from an input 3 of the text-processing system to an input 2 of said device. The sound signals are obtained, for example, directly from a microphone or are reproduced by means of a dictation machine employed as a temporary store. These electric signals may be either analog signals or digital signals, which last-mentioned signals may be in encoded form, depending on the type of speech-recognition device used. A variety of such devices suitable for use in the present case are known. The speech-recognition device 1 is controlled by means of a computer 4, which also controls the entire text-processing system. From the input 2 of the speech recognition device 1 the electric signal is applied in customary manner to an acoustic analyser 5, which determines salient features which are characteristic of this signal, for example, energy-concentration poles within the frequency spectrum which are subsequently stored in a feature memory 6. This feature memory 6 provides an input to the actual word-recognition device 7 of the speech-recognition device 1, which is also connected to a series of memories enabling individual words to be identified by the device. In the customary manner these memories comprise a speech-model memory 8 for the storage of probable word sequences enunciated by a specific speaker or several speakers, a phonetics memory 9 for the storage of sound compositions, which may be speaker-related, for the words which can be recognized by the speech recognition system, and a pronunciation-feature memory 10 for the storage of parameters relating to the characteristic pronunciation of a specific speaker or several speakers. In the present case the speech-recognition device 1 further comprises a learning device 11, which cooperates directly with the word-recognition device 7 and the feature memory 6 and which also has access to the above-mentioned memories 8, 9 and 10. In the course of a learning process the features derived from a sound signal enunciated by a specific speaker of a word by means of the speech-recognition device 1 and stored in the feature memory 6 are analysed by the learning device 11 by comparison with speech-related parameters which are stored, for example, in the memories 8, 9 and 10 and which are applied to the learning device and the word which is associated with the relevant sound signal and which is also applied to the learning device, for example, by the computer 4, which features are stored in the memories 8, 9 and 10 of the speech-recognition device as speaker-related parameters so that they are hence forth available to the word-recognition device 7.

Said means enable the individual words of the complete text contained in the sound signals to be recognized, which words are subsequently stored in a word memory 12 as digital signals, in which memory they are then available for further processing and can be applied to a display device 13 or a printer 14 via the computer 4. In this way the text represented by the sound signal can be displayed directly on the display device 13 as a text made up of individual words, where it is available for checking or correction, which is necessary because such speech-recognition devices generally exhibit a specific error rate, which implies that individual words or word groups are not identified correctly and therefore appear incorrectly on the display.

In order to facilitate the correction of erroneously detected words the present text-processing system utilizes further steps, which will be explained hereinafter.

In particular, the sound signals applied to the input 3 of the text-processing system as electric signals are stored in a first further memory 15. For the storage of the sound signals in the first further memory 15 various possibilities are available depending on the construction of this further memory. For example, such a first further memory may be an audio-tape apparatus on which the audio signals are stored as analog signals, However, such a first further memory may alternatively be a digital memory, to which the audio signals are applied after digitization or encoding, such memories having the advantage of a more rapid access to the memory contents. Said memory may be, for example, a disk storage or a solid-state memory. Moreover, the memory of a central dictating system may also be used as such a first further memory, Alternatively, the input signal to be applied to the input 2 of the speech recognition device 1 itself may be provided by an output of such first further memory.

Moreover, start marks and end marks are allocated to the individual words detected by the speech-recognition device and stored in the word memory 12, which marks are in a specific time relationship with the sound signals stored in the first further memory 15. In this way every detected word is bounded by a start mark and an end mark, and the end mark of a word may at the same time constitute the start mark of the next word. In this respect it is essential that in generating these marks it is guaranteed that they are in a specific time-relationship with the sound signals stored in the first further memory 15. For this purpose a time-counting process may be carried out, for example, by means of the clock signal of the computer 4, during the speech-recognition process thereby to consecutively define the individual time intervals occurring between individual word detections. The start and end marks of the individually detected words thus generated are stored in a second further memory 16, which is connected to the word-recognition device 7. Access to this second further memory 16 is provided via the computer 4. The computer 4 also has access to the first further memory 15 in which the audio signals are stored. By means of the start marks and the end marks of a detected word stored in the second further memory 16, the computer 4 can thus establish a correlation with the sound signal associated with a detected word and stored in the first further memory 15, enabling a detected word displayed by means of the display device 13 to be high-lighted, for example, with a cursor or by underscoring, under control of the computer 4 and at the same time the corresponding audio signal to be reproduced acoustically.

Thus, the text formed by the words displayed by means of the display device 13 can be checked or corrected simply, rapidly and reliably. By means of a keyboard 17 which cooperates with the computer 4 and which serves for the entry of instructions and data, a high-lighted word displayed on the display device 13 can be corrected, if necessary. For example, within the complete text formed by the words displayed on the display device a single word of this text can be high-lighted under control of the keyboard 17 and the computer 4, after which, by means of the computer 4, the start marks and end marks corresponding to the high-lighted word and stored in the second further memory 16 are detected and, depending upon said marks the corresponding audio signals stored in the first further memory 15 can be read out and can be reproduced acoustically, for example, by means of a loudspeaker 18, which reproduction may be non-recurrent or recurrent. In this way the user of the system has a direct way of monitoring the audio signal corresponding to the relevant high-lighted word in order to verify whether the relevant word has been detected correctly or erroneously by means of the speech-recognition device 1. In the case of an erroneously detected word the user of the system can replace the erroneously detected word by the correct word by means of the keyboard 17. However, it is also possible to perform, for example, a continuous check of the text displayed by means of the display device 13 in such a way that the sound signals stored in the first further memory 15 are continuously reproduced acoustically, while at the same time the corresponding detected words are high-lighted on the display device 13 by means of the computer 4 in conjunction with the start and end marks of every detected word as stored in the second further memory 16. Thus, the user of the system continuously hears the spoken text and at the same time his attention is drawn to the word detected by the speech-recognition device which is high-lighted in the displayed text. It is evident that as a result of these different possibilities of using the described text-processing system a text can be checked and corrected simply and reliably, after which the finished correct text can be printed by means of the printer 14.

It is advantageous to apply the corrected version of a detected word which has been high-lighted on the display device 13 and corrected by means of the keyboard 17, together with the features stored in the feature memory 6, which features have been derived from the sound signal of the original word by means of the speech-recognition device 1, to the learning device 11 for analysis. The speaker-related parameters which are newly derived in the course of this analysis are also stored in the memories 8, 9 and 10 of the speech recognition device 1. In the present case it is assumed that all of the characteristic features derived from the sound signals of the entire text by means of the speech-recognition device 1 are continuously available for such learning processes in the feature memory 6, and the features corresponding to the sound signal of a word can always be read out, which requires a feature memory 6 having a comparatively large storage capacity. Another possibility is to utilize the sound signals stored in the first further memory 15 for such learning processes and to re-detect the relevant features each time by means of the speech-recognition device 1 and store them again in the feature memory 6. The storage capacity of the feature memory 6 can then be smaller. For this purpose it is possible, for example, by means of a switch 19, to connect the input 2 of the speech-recognition device 1 to an output of the first further memory 15 instead of to the input 3 of the system. The computer 4 then again provides access to every sound signal portion stored in the first further memory 15 and corresponding to a relevant word detected by the speech-recognition device. In this way the learning device 11 modifies or updates the speaker-related parameters stored in the memories 8, 9 and 10 of the speech-recognition device 1 in such a way that the speech-recognition device 1 performs a further learning process relating to the relevant speaker to ensure that if in the future a sound signal corresponding to such a word occurs again, the probability of said word being correctly detected at once by the speech recognition device 1 increases so that the error rate of such a text-processing system is thus reduced continually.

It is also advantageous, after all of the words which have been detected erroneously by the speech-recognition device 1 have been corrected by means of the keyboard 17 to apply the words forming the complete text, together with the features derived from the sound signals of the original words by means of the speech-recognition device and stored in the feature memory 6, to the learning device 11 for analysis. The newly derived speaker-related parameters obtained in the course of this analysis are also stored in the memories 8, 9 and 10 of the speech-recognition device. In this way the entire text already corrected is utilized in a learning process of the system so that both the error rate of erroneously detected words is reduced and a rapid adaptation of the system to the characteristic pronunciation of a specific speaker and to specific phrases frequently used by the relevant speaker is achieved, resulting in a substantial improvement of the performance of such a system.

As will be apparent from the foregoing, a variety of modifications of the described embodiment are possible without departing from the scope of the invention. This applies, in particular, to the manner in which the sound signals are stored in the first further memory, the manner in which the start marks and end marks are generated and analysed, which marks bound a word detected by the speech-recognition device, and the operation of the actual speech-recognition device. It is obvious that such a text-processing system can also perform other functions which are customary in such system, such as, for example, text merging or the like.

We claim:

1. A text-processing system comprising: means for applying sound signals corresponding to a word text to a speech-recognition device, said speech recognition device including means for detecting the words in the sound signals, means for storing said words in a word memory in the form of digital signals and for supplying said words from said memory to a further processing means, means for reproducing said words as a text by means of a display device and for correcting said words when necessary, a printer for printing said words, means for storing the sound signals in a first further memory, means for allocating start marks and end marks to the words detected by the speech-recognition device under control of a computer which cooperates with a keyboard, which marks are related in time to the sound signals stored in the first further memory, said start marks and end marks being stored in a second further memory, wherein, by means of the start and end marks of a detected word stored in the second further memory, the computer is adapted to establish a correlation with the sound signal corresponding to a detected word and stored in the first further memory, means, under control of the computer, for high-lighting a detected word on the display device and at the same time reproducing the associated audio signal acoustically, and wherein, by means of the keyboard, data is loaded into the computer and a detected word, which is high-lighted on the display device, is corrected, if necessary.

2. A system as claimed in claim 1, wherein the speech recognition device cooperates with a learning device, the speech-recognition device includes means for deriving features characteristic of the sound signal enunciated by a specific speaker of a word from said sound signal, wherein the learning device includes means for analyzing said features by comparison with speech-related parameters applied to said learning device and the word corresponding to the relevant sound signal applied to said learning device and are stored in the speech-recognition device as speaker-related parameters, which can be utilized by the speech-recognition device in the process of speech recognition, means for applying a detected word, which has been high-lighted on the display device and corrected by means of the keyboard, to the learning device for analysis together with the features derived from the the sound signal of the original word, and means for storing in the speech-recognition device speaker-related parameters newly derived in the process of said analysis by the learning device.

3. A system as claimed in claim 1 further comprising a learning device which cooperates with the speech-recognition device which includes means for deriving features which are characteristic of a sound signal enunciated by a specific speaker of a word from said sound signal, wherein the learning device includes means for analyzing said features by comparison with speech-related parameters applied to said learning device and the word corresponding to the relevant sound signal applied to said learning device and are stored in the speech-recognition device, as speaker-related parameters, which are utilized by the speech-recognition device in the process of speech recognition, wherein after all words detected erroneously by the speech-recognition device have been corrected by means of the keyboard, the system further includes means for applying the words forming the complete text together with the features derived from the sound signals of the original words to the learning device for analysis, and means for storing in the speech-recognition device the speaker-related parameters newly derived in the process of said analysis by the learning device.

4. A text processing system comprising:
an input for receiving electric sound signals corresponding to a word text,
a first memory coupled to said input for storing the received sound signals,
a speech-recognition device having an input coupled to the sound signal input and an output coupled to a second memory, means for detecting words in the sound signals, and means for storing said words in a word memory,
a display device for reproducing said words as a text,
a computer coupled to said first memory, to said speech-recognition device and to said display device for controlling the operation thereof,
a keyboard coupled to said computer,
means coupling the second memory to the computer whereby, under control of the computer, said second memory stores start marks and end marks correlated in time to words detected by the speech-recognition device and to sound signals stored in the first memory.
wherein by means of said stored start marks and end marks the computer is operative to establish a correlation with a sound signal corresponding to a detected word and stored in said first memory,
means controlled by the computer for accentuating a detected word displayed on the display device and simultaneously acoustically reproducing the corresponding sound signal stored in the first memory, and wherein
the keyboard is adapted to corrected an accentuated word displayed on the display device when said displayed accentuated words does not match the corresponding acoustically reproduced sound signal.

* * * * *